W. D. FORSYTH.
CAR TRUCK SIDE FRAME.
APPLICATION FILED MAY 4, 1912.
1,080,523.
Patented Dec. 2, 1913.
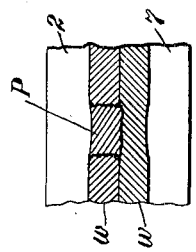
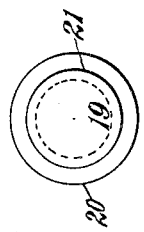
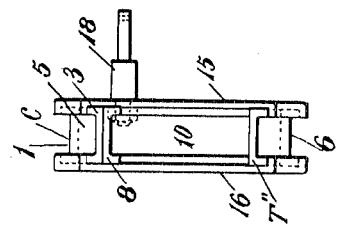
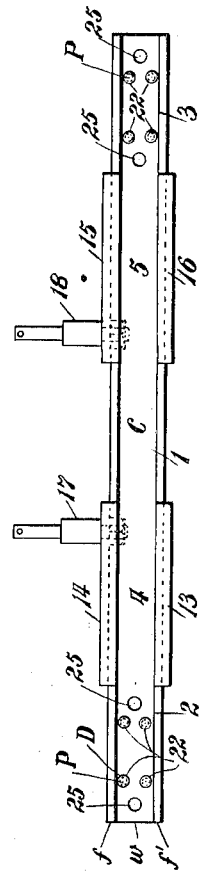
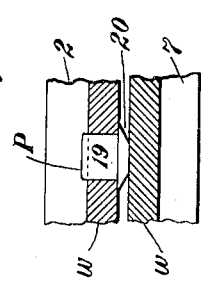
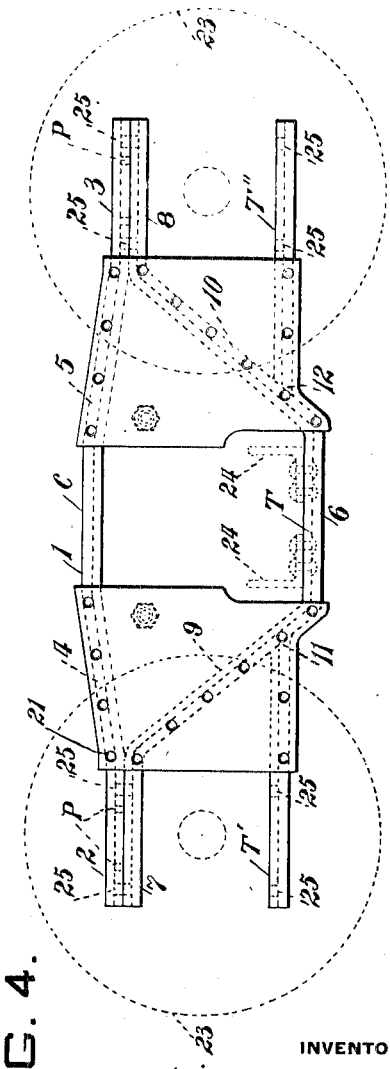
WITNESSES
A. M. Goodwin
M. E. Thomas
INVENTOR
William D Forsyth
by A. M. Reeper
Attorney

UNITED STATES PATENT OFFICE.

WILLIAM D. FORSYTH, OF YOUNGSTOWN, OHIO.

CAR-TRUCK SIDE FRAME.

1,080,523.  Specification of Letters Patent.  Patented Dec. 2, 1913.

Application filed May 4, 1912. Serial No. 695,073.

*To all whom it may concern:*

Be it known that I, WILLIAM D. FORSYTH, of the city of Youngstown, county of Mahoning, and State of Ohio, have invented new and useful Improvements in Car-Truck Side Frames, of which the following is a specification.

This invention relates to improvements in car truck side frames manufactured from rolled sections of metal, preferably of steel, the parts of which are electrically welded, so as to produce a truck side frame whose parts are connected by permanent metallic structures integral with said parts.

The object of this invention is to produce a car truck side frame of rolled or forged metal, preferably steel, and to assemble its parts by means of electrically welding them together so that the entire structure will have its parts welded in such a way as to approximate the strength and characteristics of a side truck frame forged from a single piece of metal.

The invention consists of a car truck side frame of the construction shown and described hereinafter in detail.

In the accompanying drawings forming part of this specification, Figure 1 is a side elevation of the car truck side frame constituting the invention; the wheels of the car to which it may be attached are shown in dotted lines; Fig. 2 is an end view of Fig. 1; Fig. 3 is a top plan view of Fig. 1. Fig. 4 shows a welding plug in position to be electrically welded so as to join parts of the car truck side frame. Fig. 5 shows the condition of said welding plug after having been fused by the electric current. Fig. 6 shows the top plan view of said welding plug, showing the circumference of the shank thereof in dotted lines.

In Fig. 1, C is a compression member. T is a tension member having journal-box supporting branches T', T''. C and T are made preferably of steel channels having web, $w$, and flanges, $f$, $f'$, Fig. 3. Compression member C is formed with a middle portion, 1, and ends, 2 and 3, 2 being connected to 1 by inclined part 4, and 3 being connected to 1 by inclined part 5. T has a central portion, 6, and two ends, 7 and 8, respectively, 7 being connected to 6 by inclined part 9, and 8 being connected to 6 by inclined part 10. T has two journal-box supports or branches, T', T''. T' is connected to T preferably by welding at 11 and T'' is connected in the same manner to T at 12. 13, 14, 15 and 16 are plates, preferably of the shape shown in elevation in Fig. 1, which are flanged at their upper and lower edges and shaped so as to conform to compression member C at their top edges and tension member T and its branches T', T'', at their lower edges. The plates are made in rights and lefts and are welded to the back and front of the car truck side frame consisting of C and T in the manner hereinafter set forth and as shown in Figs. 1, 2 and 3. To 14 and 15 are attached in a suitable manner brake hangers 17 and 18, which are of the usual construction. P is a welding plug having a shank, 19, and a head, 20, Fig. 4. The top of the head has a greater sectional area than the shank of the plug so that when the electric current is applied to the plug, when the parts of the side frame are being welded together, the greatest resistance at the beginning of the application of the current to the flow of the current will be at the head of the plug with the part of the frame with which said head is in contact. Because of the difference of sectional area of the head of the welding plug and the shank thereof and surrounding plate with which said shank is in electric contact, the passing of the current through the plug causes the same to fuse first at the head of said plug and then progressively through the shank until the entire plug is fused and incorporated in the parts to be welded together.

In Fig. 4, 2 is a part of C and 7 is a part of T, shown in section through one of the plugs 19 at D, Fig. 3. The section lined parts of Fig. 4 represent a part of the web at 2 of C and a part of the web of 7 of T respectively. It will be noted that the web of 2 only is perforated for the insertion of the welding plug P; that said plug is inserted so that the head thereof comes in contact with the web of 7. All of the plugs P used in the construction of the frame are inserted in the holes made in the same manner as indicated in Fig. 4 between parts 2 and 7 of C and T respectively; that is to say, where two parts of the frame are to be welded, only one of the two parts thus to be welded is pierced for the reception and holding of the welding plug, P. After the welding plugs have been inserted at the points hereinafter designated and the current applied thereto, the plugs are fused and pressure of the electric welding ram or machine compels the part to take the shape and structure shown in Fig. 5, the fusing of plug P merging or incorporating the metal contained therein in the mass of the webs of 2 and 7 as shown in said figure, and in like manner between other parts of the truck side frame when welded as herein described. 21 indicates the welding plugs that are inserted in suitable holes in plates 13, 14, 15 and 16, in the locations shown in Fig. 1, the heads of said plugs being in contact with the flanges of C, T, T' and T'' at the points shown. When the plugs are thus inserted in the plates with the heads thereof in contact with the flanges of the compression and tension members of the truck side frame as aforesaid, the electric current is passed therethrough with the effect that said plugs are fused and the metal in them is incorporated in the plates of said compression and tension members in the manner as hereinbefore described in connection with the webs of 2 and 7 and as shown in Fig. 4. The same procedure is had with the plugs 22, 22, 22 in the ends 2 and 3 of C and 7 and 8 of T, respectively. Dotted lines 23 show the outline of the wheels of the car in connection with which the car truck side frame will be used. Dotted lines 24, 24 show angles by which side frames of the truck are connected together. Holes 25 are placed in the ends, 2, 3, T', T'', for the reception of bolts to hold journal boxes in position.

What I claim as my invention is:

1. A car truck side frame comprising a flanged compression member with its central part connected by downwardly inclined parts to its ends, whose flangeless under surfaces are in the same plane; a flanged tension member with its central part connected by upwardly inclined parts to its ends, whose flangeless upper surfaces are in the same plane; the ends of said members being welded together by metal derived from a source other than said members fused into their respective masses.

2. A car truck side frame comprising a flanged compression member with its central part connected by downwardly inclined parts to its ends, whose flangeless under surfaces are in the same plane; a flanged tension member with its central part connected by upwardly inclined parts to its ends, whose flangeless upper surfaces are in the same plane; the ends of said members being welded together by metal derived from a source other than said members and fused into their respective masses; two journal box supporting branches welded to the inclined parts of the tension member at opposite sides of said frame, so that the ends of said branches will be substantially parallel to the welded ends of said frame.

3. A car truck side frame comprising a flanged compression member with its central part connected by downwardly inclined parts to its ends, whose flangeless under surfaces are in the same plane; a flanged tension member with its central part connected by upwardly inclined parts to its ends, whose flangeless upper surfaces are in the same plane; the ends of said members being welded together by metal derived from a source other than said members and fused into their respective masses; two journal box supporting branches welded to the inclined parts of the tension member at opposite sides of said frame, so that the ends of said branches will be substantially parallel to the welded ends of said frame; plates welded to the front and back of said frame by metal derived from a source independent of said frame and plates and fused into their masses, so as to provide a bolster opening in said frame, said plates being flanged upon their upper and lower edges and shaped so as to conform to the upper and lower edges of said frame.

4. A car truck side frame comprising a compression member with its central part connected by downwardly inclined parts to its ends, whose under surfaces are in the same plane; a tension member with its central part connected by upwardly inclined parts to its ends, whose upper surfaces are in the same plane; the ends of said members being welded together by metal derived from a source other than said members and fused into their respective masses; two journal-box supporting branches welded to the inclined parts of the tension member at opposite sides of said frame, so that the ends of said branches will be substantially parallel to the welded ends of said frame.

5. A car truck side frame comprising a compression member with its central part connected by downwardly inclined parts to its ends, whose under surfaces are in the same plane; a tension member with its central part connected by upwardly inclined parts to its ends, whose upper surfaces are in the same plane; the ends of said members being welded together by metal derived from a source other than said members and fused into their respective masses; two journal-box supporting branches welded to the inclined parts of the tension member at opposite sides of said frame, so that the ends of said branches will be substantially parallel to the welded ends of said frame; plates welded to the front and back of said plane by metal derived from a source independent of said frame and plates, and fused into their masses so as to provide a bolster opening in said frame, said plates being flanged upon their upper and lower edges and shaped so as to conform to the upper and lower edges of said frame.

In testimony whereof I have signed this specification in the presence of two subscribing witnesses.

WILLIAM D. FORSYTH.

Witnesses:
J. R. D. HUSTON,
M. E. THOMAS.